(12) United States Patent
McClure et al.

(10) Patent No.: US 6,433,514 B1
(45) Date of Patent: Aug. 13, 2002

(54) BATTERY PROTECTOR

(75) Inventors: Winthrop H. McClure, Londonderry, NH (US); Roman Korsunsky, Apex; Larry Wofford, Cary, both of NC (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/678,545

(22) Filed: Oct. 4, 2000

Related U.S. Application Data (60) Provisional application No. 60/157,428, filed on Oct. 4, 1999.

(51) Int. Cl.[7] ............................ H02J 7/00; G08B 21/00; G08C 19/16
(52) U.S. Cl. .................... 320/136; 340/602; 340/870.17
(58) Field of Search ................................ 320/135, 150, 320/136; 340/602, 870.17

(56) References Cited

U.S. PATENT DOCUMENTS

| | | | |
|---|---|---|---|
| 5,486,815 A | * | 1/1996 | Wagner ........................ 324/664 |
| 5,581,170 A | | 12/1996 | Mammano et al. ............ 320/17 |
| 5,652,501 A | | 7/1997 | McClure et al. ............... 320/17 |

OTHER PUBLICATIONS

Salerno et al., "Practical Considerations in the Design of Lithium–Ion Battery Protection Systems", Design Note, Unitrode Corporation, Nov. 10, 1997.
Unitrode Corporation., "Single Cell Lithium–Ion Battery Protection Circuit", Internal Document No. UCC3958 –1/–2/–3/–4.

* cited by examiner

Primary Examiner—Gregory Toatley
(74) Attorney, Agent, or Firm—W. Daniel Swayza, Jr.; W. James Brady; Frederick J. Telecky, Jr.

(57) ABSTRACT

A battery protection circuit includes a moisture detection circuit, a temperature sensing circuit, and a high-temperature battery discharge circuit. The moisture detection circuit includes a pair of conductive traces closely spaced on a substrate such that a resistive path is formed between the traces when moisture forms on the substrate. The traces are connected between the positive battery terminal and a pull-down current source. When moisture forms on the substrate, pull-up current flows between the traces, and a resulting voltage change on one of the traces is detected by circuit element such as a logic inverter. The temperature sensing circuit includes a voltage reference circuit that generates a proportional-to-temperature voltage and temperature-independent voltage reference signals corresponding to various predetermined temperatures. A measuring circuit operates during a sampling interval to compare each temperature-dependent voltage to the proportional-to-temperature voltage and to store the result of each comparison until a subsequent temperature sampling interval. The measuring circuit includes multiplexing circuitry used to sequentially select each temperature-dependent voltage during a sampling interval. The high-temperature discharge circuit connects a discharge load across the battery when the voltage of the battery is above a high voltage threshold and the temperature of the battery is above the high temperature threshold. When no external charger is active, the discharge current flowing through this load works to reduce battery voltage. helping to prolong battery life.

17 Claims, 7 Drawing Sheets

BATTERY PROTECTOR

CROSS REFERENCE TO RELATED APPLICATIONS

This application claims priority under 35 U.S.C. §119(e) of provisional patent application no. 60/157,428 filed Oct. 4, 1999, entitled "Battery Protector".

STATEMENT REGARDING FEDERALLY SPONSORED RESEARCH OR DEVELOPMENT

Not Applicable

BACKGROUND OF THE INVENTION

The present invention is related to the field of battery protection circuits.

The need for special battery protection circuits has increased due to the widespread use of batteries such as lithium-ion batteries, which are inherently less tolerant of adverse operating conditions than are more traditional batteries such as those using nickel-based chemistries. Circuits have been used to detect whether battery voltage or current exceeds a predetermined safe level, and take certain compensatory actions upon detection of such conditions. For example, if excessively high battery current is detected, a protection circuit may turn off a protection transistor arranged in series with the battery, interrupting the flow of current.

For applications in which it is important to make efficient use of stored battery power, it is desirable that protection circuitry consume as little power as possible. Additionally, many battery applications are particularly cost sensitive. For such applications, it is important that the battery protection circuitry be relatively simple, compact, and easily manufactured.

It has been determined that the operating temperature of lithium-ion and similar batteries plays a significant role in efficient battery operation. It is desirable, for example, to charge such a battery only when the temperature is within certain ordinary limits, such as between about 0° C. and about 35° C. Also, battery life may be reduced if the battery is exposed to very high temperatures while being in a fully charged state. It is desirable to provide battery protection circuitry capable of addressing these operational concerns.

BRIEF SUMMARY OF THE INVENTION

In accordance with the present invention, a battery protection circuit is disclosed that addresses several special considerations in the use of lithium-ion and similar batteries, such as temperature-dependent operation, undesirable exposure of the battery to moisture, and avoiding certain conditions that may shorten battery life.

The disclosed battery protection circuit includes a moisture detection circuit, a temperature sensing circuit, and a high-temperature battery discharge circuit. The moisture detection circuit includes a pair of conductive traces closely spaced on a substrate such that a resistive path is formed between the traces by moisture that forms on the substrate. The traces are connected between the positive battery terminal and a pull-down current source. When moisture forms on the substrate, a resistance is formed between the traces. The resulting pull-up current that flows between the traces causes a voltage change on one trace, which is detected by a circuit element such as a logic inverter. The output of the circuit element can be used to provide an indication to a user or to initiate other appropriate action.

The temperature sensing circuit includes a voltage reference circuit that generates a proportional-to-temperature voltage and temperature-independent voltage reference signals corresponding to various predetermined temperatures. A measuring circuit operates during a low-duty-cycle sampling interval to compare each temperature-dependent voltage to the proportional-to-temperature voltage and to store the result of each comparison until a subsequent temperature sampling interval. The measuring circuit includes multiplexing circuitry used to sequentially select each temperature-dependent voltage during the sampling interval, and provide the selected voltage to a comparator along with the proportional-to-temperature voltage. The output of the comparator is then selectively stored in a corresponding one of a set of storage devices such as flip/flops. The outputs of these storage devices can be used for a variety of operations that rely on information about the temperature of the battery.

The high-temperature discharge circuit connects a discharge load across the battery when the voltage of the battery is above a high voltage threshold and the temperature of the battery is above the high temperature threshold. When no external charger is active, the discharge current flowing through this load works to reduce battery voltage. By reducing battery voltage when the battery is exposed to high temperature, battery life can be prolonged.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
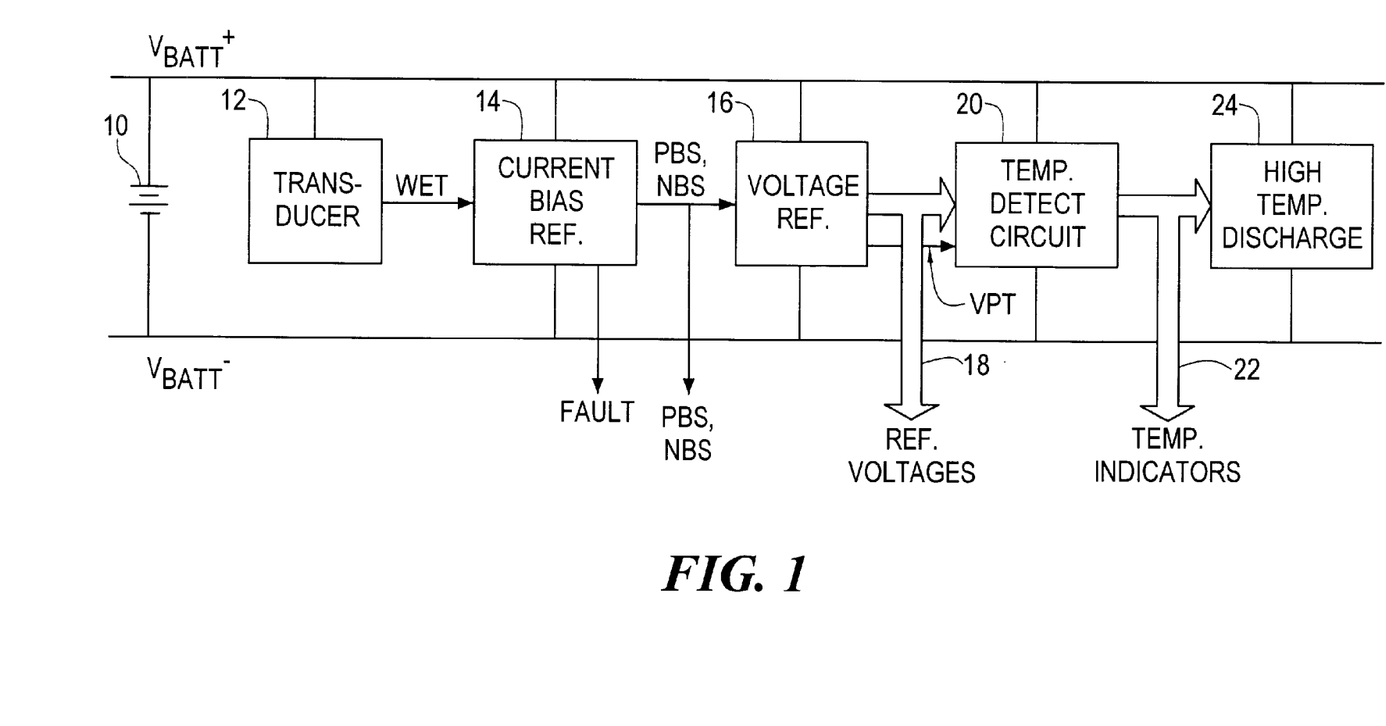
FIG. 1 is block diagram of a battery protection circuit in accordance with the present invention.

In FIG. 1, a number of functional circuit elements are connected to the terminals $V_{BATT}^+$ and $V_{BATT}^-$ of a lithium ion battery 10 by corresponding conductors. As will be appreciated from the following description, the various components are preferably located very closely to the battery 10, and in fact in one embodiment may be located within the battery casing. In this manner, battery variables such as voltage and temperature can be more accurately detected for optimal operation of the battery protection circuitry.

A moisture transducer 12 has an input connected to the positive battery terminal $V_{BATT}^+$ and an output labeled WET that is provided to a current bias reference circuit 14. As described in more detail below, the resistance of the transducer 12 in the presence of moisture (referred to herein as the "wet" resistance) is substantially different from the resistance of the transducer 12 in the absence of moisture (referred to as the "dry" resistance). The current bias reference circuit 14 detects when the resistance of the transducer 12 is equal to its wet resistance, and generates a signal FAULT indicating the presence of moisture. The signal FAULT can be used by other circuitry (not shown) to alert a user that a potentially unsafe operating condition exists, enabling the user to take appropriate action.

In addition to its moisture-detection functionality, the current bias reference circuit 14 generates current bias reference signals PBS and NBS used by a voltage reference circuit 16 and other circuitry (not shown) that may require a precision current reference for operation. The circuitry generating the signals PBS and NBS is described with reference to FIG. 4 below.

The voltage reference circuit 16 of FIG. 1 generates a number of different temperature-independent reference voltages 18 and a voltage VPT whose value is proportional to the temperature of internal circuit devices. These signals are provided to a temperature detection circuit 20 as shown, and may be used by other circuitry (not shown) as well. Preferably, the voltage reference circuit 16 has sufficient thermal coupling to the battery 10 such that the temperature of its circuit devices substantially tracks the temperature of the battery 10, in which case the voltage signal VPT accurately represents the temperature of the battery 10.

The temperature detection circuit 20 periodically performs comparisons between the signal VPT and certain ones of the voltage reference signals 18, as described in more detail below. The results of these comparisons are held in storage devices between successive sampling intervals. The outputs of the storage devices are temperature indicator signals 22 that can be used to control temperature-dependent operations.

In particular, one or more temperature indicator signals 22 are provided to the high temperature discharge circuit 24 used to help increase the usable life of the battery 10. It has been found that exposing a battery to certain high-temperature and high-voltage conditions, such as described below, can significantly shorten battery life. When such conditions are detected, the high temperature discharge circuit 24 causes a small battery discharge current to flow. If there is no source of charge current, the discharge current eventually returns the battery voltage to a suitable level.

Figure 2:
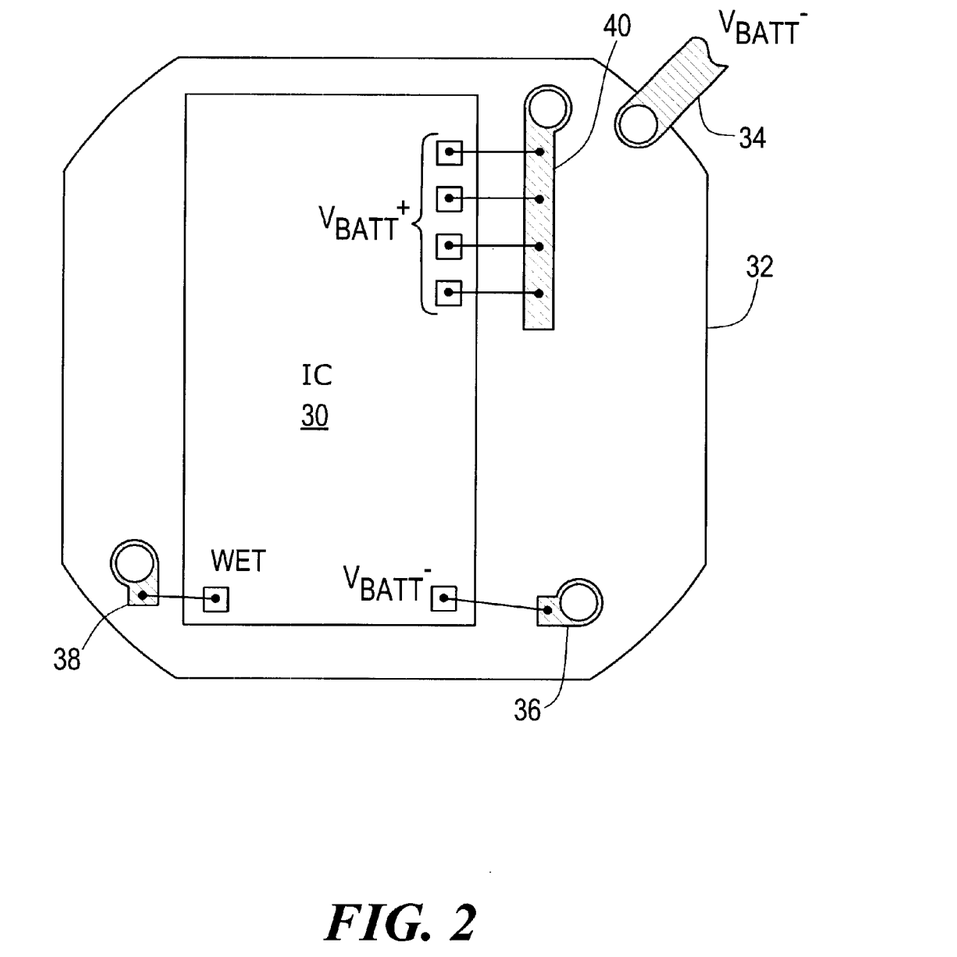
FIG. 2 is a diagram of one side of a substrate containing the protection circuit of FIG. 1.

FIG. 2 shows a physical packaging arrangement for the battery protection circuitry of FIG. 1. The circuits 14, 16, 20 and 24 are formed on a single integrated circuit 30, which is mounted on a substrate 32 such as a small printed circuit board. A conductor 34 connects to the negative battery terminal $V_{BATT}^-$. A bonding pad of the IC 30 is connected to a conductive circuit trace 36 which is connected to the conductor 34 by a conductor on the rear of the substrate 32, as described below. Similarly, another bonding pad of the IC 30 is connected to a trace 38 which carries the signal WET. Additionally, one or more bonding pads of the IC 30 are connected to a conductive circuit trace 40 which is connected to the positive battery terminal $V_{BATT}^+$ in a manner described below.

Figure 3:
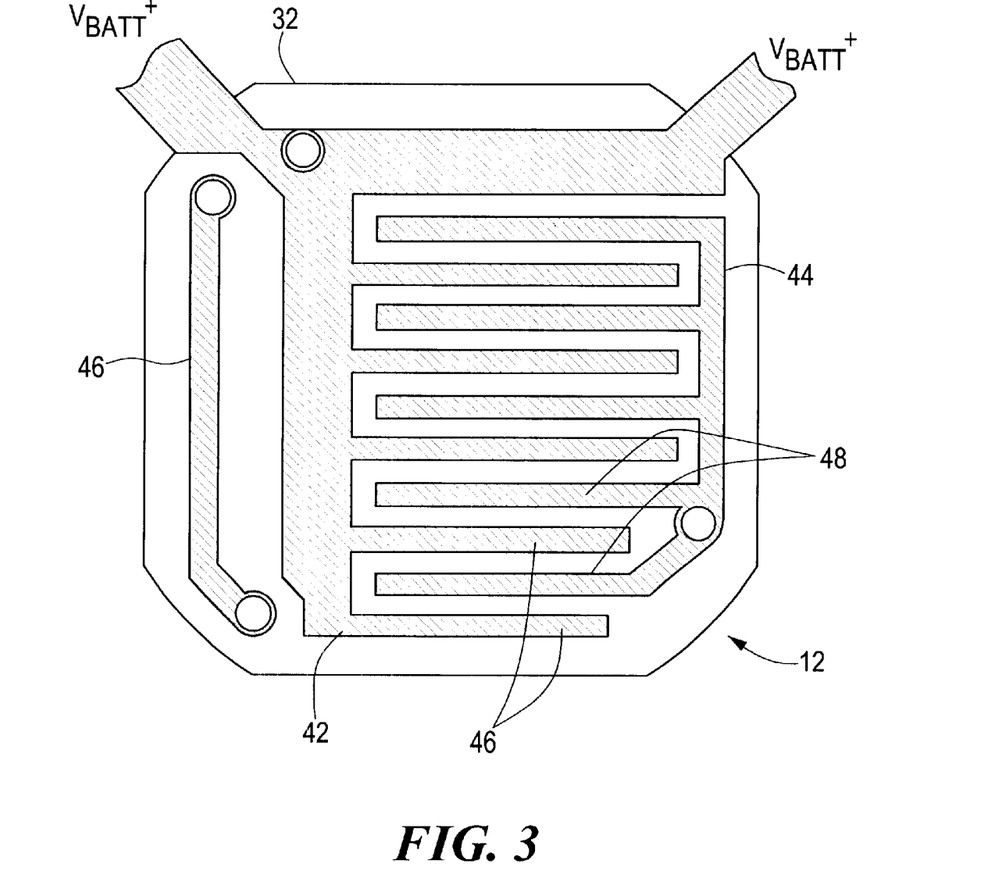
FIG. 3 is a diagram of the other side of the substrate of FIG. 2, showing a moisture transducer forming part of the battery protection circuit of FIG. 1.

As shown in FIG. 3, the reverse side of the substrate 32 includes circuit features that implement the moisture transducer 12 of FIG. 1. In particular, a pair of interdigitated circuit traces 42 and 44 carry the signals $V_{BATT}^+$ and WET respectively. Respective edges of the traces 42 and 44 are very closely spaced apart along their entirety. In the illustrated embodiment, the trace spacing and the widths of the respective trace fingers 46 and 48 are on the order of 0.2 mm, and the total length of the mutually-facing trace edges is on the order of 30 mm. With this arrangement, when the substrate 32 comes into contact with moisture, a slightly conductive path can be created between the traces 42 and 44 when a voltage on the order of the battery voltage (3 to 4 volts) exists between the traces 42 and 44. As described below, this change in electrical conductivity is detected by circuitry in the current bias reference circuit 14 of FIG. 1, and the presence of moisture is inferred therefrom.

Also shown in FIG. 3 is a conductive trace 46 used to carry the signal $V_{BATT}^-$ from the conductor 34 (FIG. 2) to the trace 36 (FIG. 2).

Figure 4:
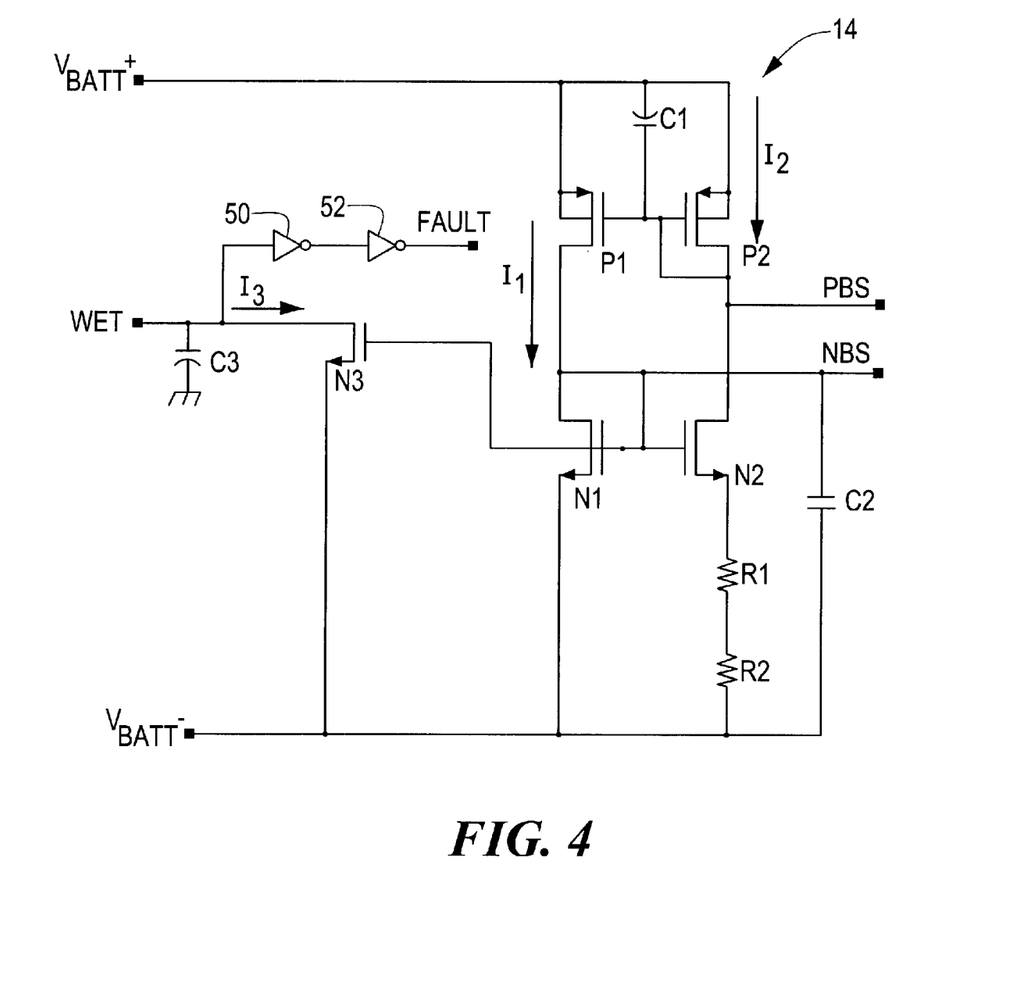
FIG. 4 is a schematic diagram of a current bias reference circuit forming part of the protection circuit of FIG. 1.

FIG. 4 shows the current bias reference circuit 14. Transistors P1, P2, N1 and N2 in combination with resistors R1 and R2 generate identical currents $I_1$, and $I_2$ equal to 205 nA. Capacitors C1 and C2 stabilize the circuitry when transient conditions occur, such as the connecting of a charger. A third branch of the current mirror, consisting of transistor N3, is capable of conducting up to 205 nA to discharge the circuit node WET to substantially the voltage $V_{BATT}^-$ under dry conditions. Because the node WET is a high-impedance circuit node, a capacitor C3 is used to protect against potential glitches that may occur. The output signal FAULT is generated from the signal WET by a cascade of two inverters 50 and 52. Under dry conditions, the signal WET is held at a low voltage, and the signal FAULT is de-asserted.

In the presence of moisture, the resistance of the transducer 12 (FIGS. 1 and 3) attains a value on the order of 5 Megohms or less, enabling a corresponding pull-up current to flow from the positive battery terminal $V_{BATT}^+$ into the circuit 14 via the node WET. This charging current is greater than the current I3. The excess current flows into the capacitor C3, eventually charging the node WET to the positive battery terminal voltage $V_{BATT}^+$. When the voltage WET becomes greater than the switching threshold at the input of the inverter 50, the output of the inverter 50 becomes a logic low, causing the FAULT signal generated by the inverter 52 to become a logic high. As indicated above, the FAULT signal can be used by other circuitry (not shown) to signal a user or otherwise initiate appropriate responsive action.

While in the circuit of FIG. 4 a logic element in the form of the inverter 50 is used to discriminate between the voltages respectively indicating wet and dry conditions, in alternative embodiments it may be useful to employ a component such as a comparator having two inputs, one receiving the signal WET and the other establishing the desired threshold voltage.

Figure 5:
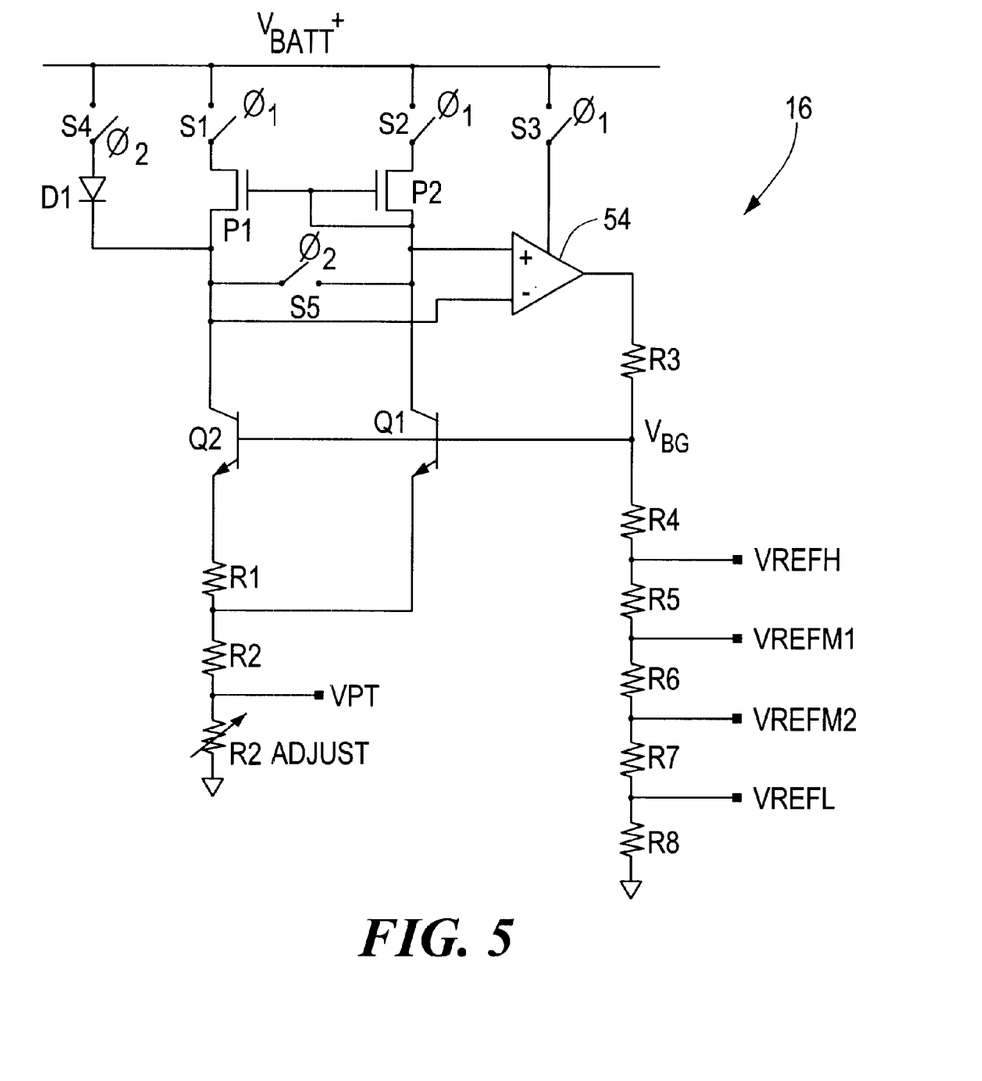
FIG. 5 is a schematic diagram of a voltage reference circuit forming part of the protection circuit of FIG. 1.

FIG. 5 shows the voltage reference circuit 16. In FIG. 5, several switches S1, S2 and S3 are shown being controlled by a clock signal $\Phi_1$, and other switches S4 and S5 are controlled by a clock signal $\Phi_2$. These clock signals are generated by clock circuitry (not shown in the Figures) preferably located on the IC 30. The clock signals $\Phi_1$ and $\Phi_2$ each have a frequency on the order of 100 Hz, and they are logic complements of each other, i.e., when one is asserted, the other is deasserted. The clock signal $\Phi_1$ preferably has a fairly low duty cycle, for example on the order of 10%. As described below, use of a low duty cycle clock minimizes the power consumption of the voltage reference circuit 16.

The voltage reference circuit 16 operates when the switches S1, S2 and S3 are closed, which occurs then the clock signal $\Phi_1$ is asserted. At these times, the main reference voltage $V_{BG}$ satisfies the following relationship:

$$V_{BG}=V_{BEQ1}+V_T[(2R_2/R_1)\,(ln\,A)]$$

where A is the ratio of the area of transistor Q2 to the area of transistor Q1. It will be appreciated that the above equation expresses the temperature independence of the voltage $V_{BG}$. The voltage $V_T$ is directly proportional to temperature, whereas the voltage $V_{BEQ1}$ is inversely proportional to temperature. Therefore, the above sum of $V_{BEQ1}$ and a scaled $V_T$ is substantially constant over temperature.

Because the voltage $V_{BG}$ is temperature-independent, the various reference voltages VREFH, VREFM1, VREFM2, and VREFL are also temperature-independent. The resistors R4 through R8 are selected such that these reference voltages take on values that correspond to predetermined temperature points. VREFH corresponds to a temperature significantly higher than the normal maximum operating temperature of the battery 10. For example, VREFH might correspond to a temperature on the order of 90° C. VREFM1 corresponds to a substantially lower temperature, such as 45° C., which is near the highest normal battery operating temperature. VREFM2 and VREFL correspond to high and low temperature limits, respectively, for charging the battery to avoid unduly reducing battery life. Typical values for these voltages correspond to temperatures of 35° C. and 0° C. respectively.

Unlike the various reference voltages VREFx, the value of the voltage VPT is proportional to temperature. This temperature dependence is due to the flow of a constant current through the resistor R2 ADJUST, whose resistance increases with temperature. As described below, the voltage VPT is used by the temperature detection circuit 20 to determine which of the temperature ranges defined by the reference voltages VREFH, VREFM1, VREFM2, and VREFL the instantaneous temperature falls within.

During the non-active portion of the operating cycle, which occurs when the clock signal $\Phi_2$ is asserted, the switches S1, S2 and S3 are open, and the switches S4 and S5 are closed. None of the main current-conducting components, such as the amplifier 54 and the transistors P1, P2, Q1 and Q2, are conducting current. When this circuitry re-enters the normal operating state upon assertion of the clock signal $\Phi_1$, it can take considerable time to re-establish the circuit conditions under which the reference voltages VREFx are valid. The circuit 16 incorporates circuitry to enable a faster restart than can generally be obtained. During the non-active interval, a diode D1 maintains a bias voltage slightly less than the voltage $V_{BATT}^+$ on both inputs to the amplifier 54. When the various devices are re-enabled upon assertion of the clock signal $\Phi_1$, the pre-established bias enables them to quickly reach their quiescent operating conditions, so that the reference voltages VREFx are quickly re-established. As a result, the duration of the active period can be minimized, resulting in reduced average power consumption.

Figure 6:
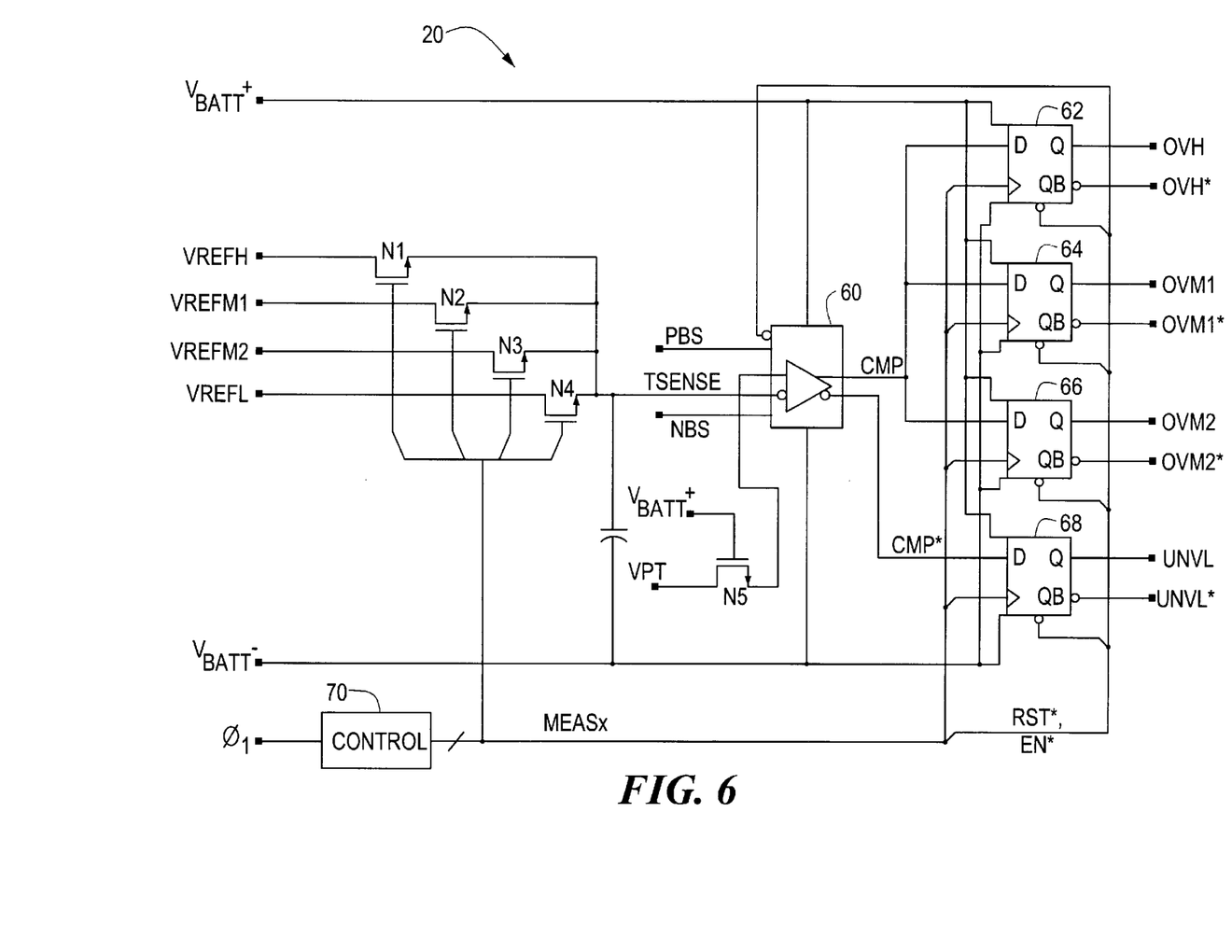
FIG. 6 is a schematic diagram of a temperature measuring circuit forming part of the protection circuit of FIG. 1.

FIG. 6 shows the temperature detection circuit 20. During the active period established by the assertion of the clock signal $\Phi_1$, the temperature-indicating signal VPT is sequentially compared with the various reference signals VREFx by a comparator 60, and the result of each comparison is stored in a corresponding flip-flop 62, 64, 66 or 68. A control circuit 70 controls this operation using control signals MEASx. For example, the control circuit 70 may first enable a pass transistor N1 and, after a suitable delay, clock the comparator output signal CMP into the flip-flop 62. By this operation, the state of output signals OVH and OVH* indicate whether the temperature is greater than the temperature corresponding to the reference signal VREFH. This operation is repeated for the other three reference signals VREFM1, VREFM2, and VREFL, establishing the respective states of output signals OVM1, OVM1*, QVM2, OVM2*, UNVL and UNVL*.

As shown in FIG. 6, the control circuit 70 also generates a reset signal RST* that is asserted during power-up to initialize the flip-flops 62, 64, 66 and 68 to the de-asserted state. Also, an enable signal EN* is used to selectively enable the comparator 60, so that it can be powered-down during the non-active interval.

Figure 7:
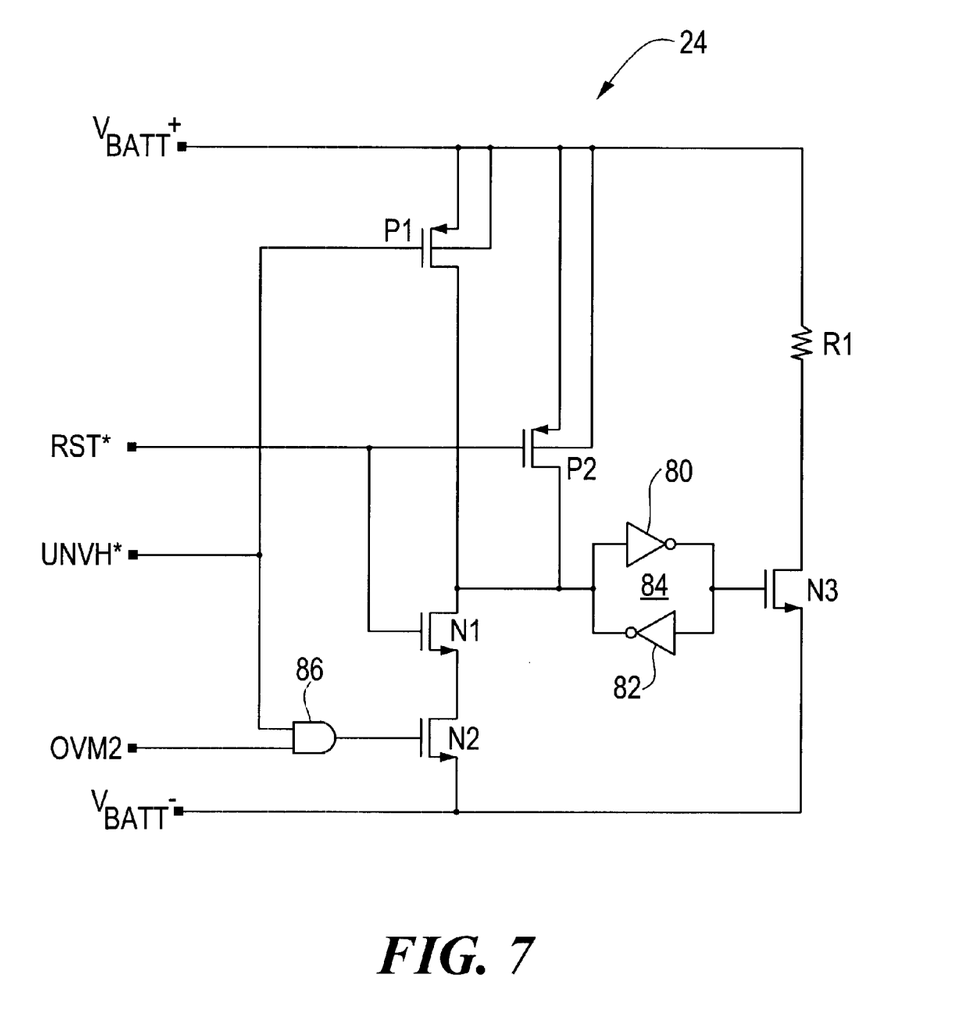
FIG. 7 is a schematic diagram of a high-temperature discharge circuit forming part of the protection circuit of FIG. 1.

FIG. 7 shows the high-temperature discharge circuit 24. A pair of inverters 80 and 82 form a latch 84 whose output controls a switching transistor N3 arranged in series with a discharge load resistor R1. The state of the latch 84 is controlled by pull-up transistors P1 and P2 and pull-down transistors N1 and N2, which in turn are controlled by input signals RST*, UNVH*, and OVM2 as shown. The signal OVM2 is received from the temperature detection circuit 20 of FIG. 1. The signal UNVH* is generated by voltage comparison circuitry (not shown), and it indicates whether the battery voltage is less than a predetermined upper limit, such as 4.0 volts.

The latch 84 is initialized to the de-asserted state upon assertion of the signal RST*, so that transistor N3 is turned OFF and no discharge current flows through the load resistor R1. When the signal UNVH* is asserted, indicating that the battery voltage is below the upper limit, the latch 84 is maintained in the de-asserted state by action of the pull-up transistor P1; the pull-down transistor N2 is OFF due to the action of an AND gate 86 having UNVH* as an input. When the battery voltage is above the limit corresponding to the signal UNVH* and the battery temperature is above the threshold corresponding to the signal OVM2, the output of the AND gate 86 becomes asserted, which turns on the transistor N2 and sets the latch 84 to the asserted state. In turn, the transistor N3 turns on, causing a predetermined discharge current to flow through the discharge load resistor R1. This operating condition persists until either the signal RST* is asserted or the battery voltage diminishes to less than the upper limit, as indicated by the assertion of UNVH*. Either of these actions causes the corresponding pull-up transistor P1 or P2 to reset the latch 84 to the de-asserted state, stopping the flow of discharge current.

A battery protector circuit incorporating several features has been shown It will be apparent to those skilled in the art that other modifications to and variations of the disclosed circuitry are possible without departing from the inventive concepts disclosed herein, and therefore the invention should not be viewed as limited except to the full scope and spirit of the appended claims.

What is claimed is:

1. A moisture detection circuit, comprising:
   a substrate having a reference conductor and a sense conductor formed thereon, the conductors being closely spaced apart such that exposure of the substrate to moisture causes formation of a conductive path carrying a sense current between the conductors when the voltage between the conductors is on the order of a circuit operating voltage;
   a voltage source coupled between the reference conductor and a reference circuit node to provide substantially the circuit operating voltage therebetween;
   a current source coupled between the sense conductor and the reference circuit node, the current source generating a bias current sufficient to maintain a first voltage on the sense conductor in the absence of the sense current and to permit the sense conductor to be driven to a second voltage in the presence of the sense current; and a voltage detection component coupled to the sense conductor, the voltage detection component being operative to discriminate between the first and second voltages so as to generate a binary output signal indicating whether the substrate is exposed to moisture.

2. A circuit according to claim 1, wherein the reference conductor and the sense conductor are interdigitated.

3. A circuit according to claim 1, wherein the voltage source is a battery.

4. A circuit according to claim 3, wherein the battery provides power for the current source and the voltage detection component.

5. A circuit according to claim 1, wherein the voltage detection component comprises a logic element having an input threshold voltage between the first and second voltages.

6. A circuit according to claim 5, wherein the logic element is an inverter.

7. A high temperature discharge circuit for a battery, comprising:

voltage detection circuitry operative to detect when the voltage of the battery is above a predetermined high voltage threshold;

temperature detection circuitry operative to detect when the temperature of the battery is above a predetermined high temperature threshold;

a latch circuit coupled to the voltage and temperature detection circuitry, the latch circuit being operative to enter a first state when the voltage of the battery is above the high voltage threshold and the temperature of the battery is above the high temperature threshold, and the latch circuit being operative to enter a second state when the voltage of the battery is below the high voltage threshold; and a switched load coupled across the battery, the switched load having a control input coupled to an output of the latch circuit and being operative to (i) conduct a predetermined discharge current when the latch is in the first state, and (ii) conduct substantially zero current when the latch is in the second state.

8. A circuit according to claim 7, wherein the switched load comprises a resistive element in series with a transistor, and wherein the conduction of the transistor is controlled by the output of the latch circuit.

9. A low-power temperature sensing circuit, comprising:

timing circuitry operative to establish a low-duty-cycle periodic temperature sampling interval;

a voltage reference circuit operative during each temperature sampling interval to generate a proportional-to-temperature (PT) voltage and a plurality of temperature-independent voltages, each temperature-independent voltage representing a corresponding predetermined temperature; and a measuring circuit operative during each temperature sampling interval to compare each temperature-dependent voltage to the PT voltage and to store the result of each comparison until the subsequent temperature sampling interval.

10. A circuit according to claim 9, wherein the voltage reference circuit includes fast start circuitry operative to maintain a biased condition during an inactive interval prior to the sampling interval such that the voltage reference signals quickly reach respective quiescent values at the beginning of the sampling interval.

11. A circuit according to claim 9, wherein the voltage reference circuit comprises:

a feedback amplifier operative to generate a main temperature-independent voltage; and a cascade of series-connected resistors connected between the main temperature-independent voltage and a circuit reference node, such that each temperature-independent voltage generated by the voltage reference circuit appears between a corresponding pair of the resistors.

12. A circuit according to claim 9, wherein the measuring circuit is operative to perform the comparing and storing for each temperature-independent voltage in sequence during the sampling interval.

13. A circuit according to claim 12, wherein the measuring circuit comprises:

a two-input comparator having one input coupled to receive the PT voltage;

multiplexing circuitry operative to selectively provide each temperature-independent voltage to the other input of the comparator;

a set of storage devices having respective inputs coupled to the output of the comparator, each storage device being associated with a corresponding one of the temperature-independent voltages; and a control circuit operative for each temperature-independent voltage to (i) configure the multiplexing circuitry to provide the temperature-independent voltage to the comparator, and (ii) enable the corresponding storage device to receive the output of the comparator.

14. A protection circuit for a battery, comprising:

a current bias reference circuit operative to be powered by the battery and to generate one or more current bias reference signals;

a moisture transducer operative in conjunction with the current bias reference circuit and in response to one of the current bias reference signals to detect the presence of moisture in the battery and to generate a moisture detection signal indicating whether the presence of moisture in the battery has been detected;

a voltage reference circuit operative to be powered by the battery and to generate a proportional-to-temperature (PT) voltage and a plurality of temperature-independent voltages representing corresponding predetermined temperatures including a predetermined high temperature threshold;

a temperature detection circuit operative to be powered by the battery and to compare, based on one or more of the current bias reference signals, each temperature-dependent voltage to the PT voltage to ascertain the operating temperature of the battery; and a high-temperature discharge circuit including (1) a voltage detection circuit operative to detect when the voltage of the battery is above a predetermined high voltage threshold, and (2) a switched load coupled across the battery, the switched load being operative to conduct a predetermined discharge current when the voltage of the battery exceeds the high voltage threshold and the operating temperature of the battery exceeds the high temperature threshold, and the switched load being operative to conduct substantially zero discharge current when the voltage of the battery does not exceed the high voltage threshold.

15. A protection circuit according to claim 14, wherein the moisture transducer comprises a substrate having a reference conductor and a sense conductor formed thereon, the conductors being closely spaced apart such that exposure of the substrate to moisture causes formation of a conductive path carrying a sense current between the conductors when the voltage between the conductors is on the order of a circuit operating voltage, and wherein the battery voltage is coupled between the reference conductor and a reference circuit node to provide substantially the circuit operating voltage therebetween, and wherein the one current bias reference signal is operative to maintain a first voltage on the sense conductor in the absence of the sense current and to permit the sense conductor to be driven to a second voltage in the presence of the sense current, and further comprising a voltage detection component coupled to the sense conductor, the voltage detection component being operative to discriminate between the first and second voltages so as to generate the moisture detection signal.

16. A protection circuit according to claim 14, wherein the discharge circuit comprises a latch circuit coupled to the voltage and temperature detection circuits, the latch circuit being operative to enter a first state when the voltage of the battery is above the high voltage threshold and the temperature of the battery is above the high temperature threshold, and the latch circuit being operative to enter a second state when the voltage of the battery is below the high voltage threshold, and wherein the switched load is operative in response to the state of the latch circuit.

17. A protection circuit according to claim 14, wherein the temperature detection circuit comprises timing circuitry operative to establish a low-duty-cycle periodic temperature sampling interval, and wherein the voltage reference circuit is operative during each temperature sampling interval to generate the PT voltage and the temperature-independent voltages for the sampling interval, and wherein the temperature detection circuit further comprises a measuring circuit operative during each temperature sampling interval to compare each temperature-dependent voltage to the PT voltage and to store the result of each comparison until the subsequent temperature sampling interval.

* * * * *